Jan. 28, 1930. G. L. ROCK 1,744,802
PERCUSSION DEVICE
Filed April 29, 1926
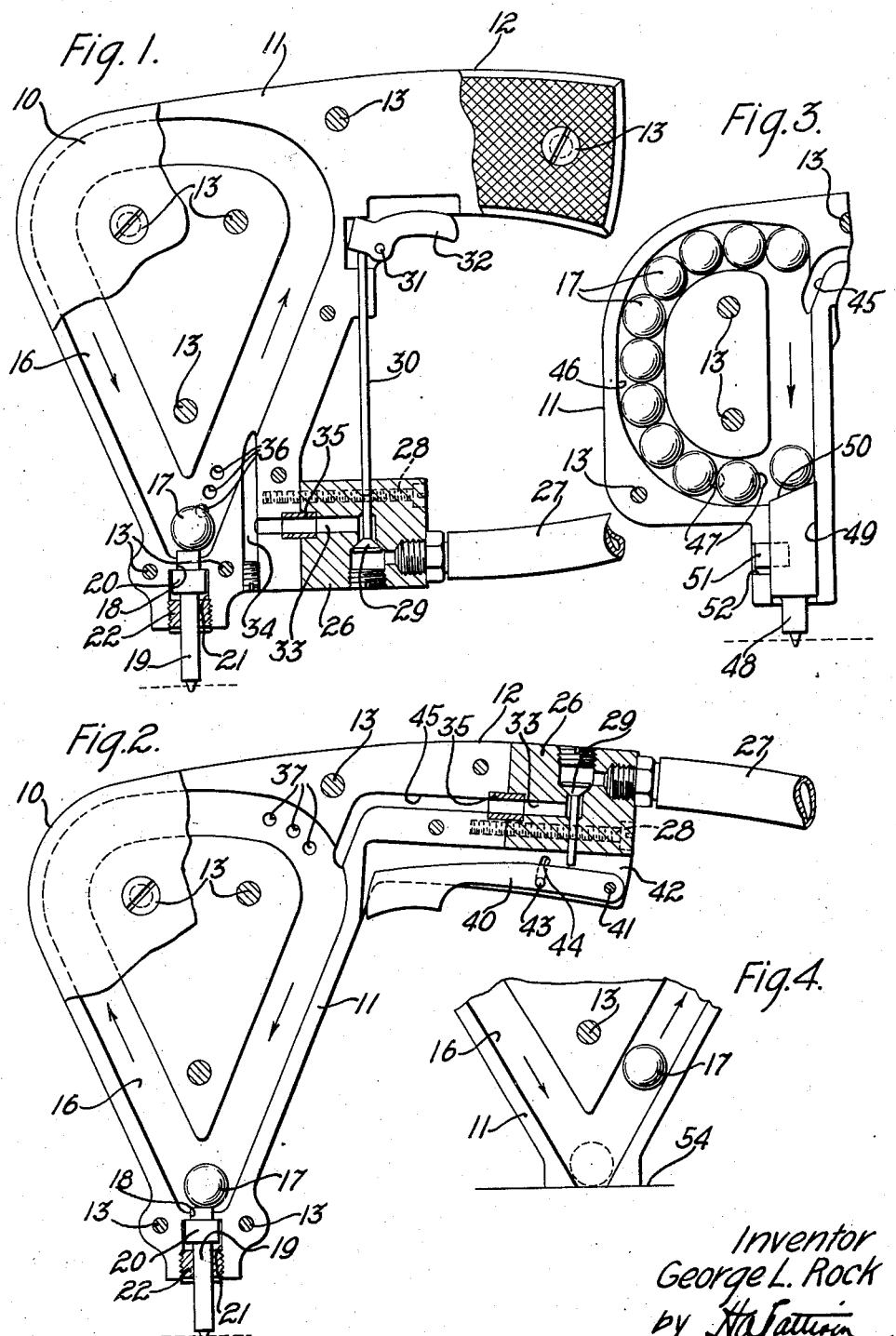
Inventor
George L. Rock
by [signature]
Att'y.

Patented Jan. 28, 1930

1,744,802

UNITED STATES PATENT OFFICE

GEORGE LYNDEN ROCK, OF CICERO, ILLINOIS, ASSIGNOR TO WESTERN ELECTRIC COMPANY, INCORPORATED, OF NEW YORK, N. Y., A CORPORATION OF NEW YORK

PERCUSSION DEVICE

Application filed April 29, 1926. Serial No. 105,383.

This invention relates to percussion devices, and more particularly to motive fluid actuated percussion devices.

An object of the invention is the provision of a percussion device arranged with an element actuated continuously by a motive fluid to produce a plurality of blows in close succession.

In accordance with one embodiment, the invention contemplates the provision of a percussion device which is capable of being set in a plurality of various positions, is easily handled and is particularly suitable for riveting, peening and such operations, and which is provided with an element actuated continuously by a motive fluid to a predetermined point where it becomes effective for producing a plurality of blows in close succession. Specifically, there is provided a supporting casing with a hand grip portion, the casing having formed therein a passageway through which a ball travels continuously upon the application of a motive fluid and in its travel imparts a series of blows in rapid succession to the work or to an element which engages the work.

Other objects and advantages of this invention will more fully appear from the following detailed description taken in connection with the accompanying drawings which illustrate several embodiments thereof, in which Fig. 1 is a side view partly in section of one embodiment of this invention;

Fig. 2 is a similar view of a modified form of the device shown in Fig. 1;

Fig. 3 is a fragmentary view of another form of the device wherein a plurality of balls are employed, and Fig. 4 is a fragmentary view of another form of the device shown in Fig. 1 designed for vibrating or peening purposes.

Referring now to the drawings in detail in which like reference numerals designate similar parts throughout the several views, and particularly to Fig. 1, which illustrates the preferred form of the device, numerals 10 and 11 indicate complementary members forming a supporting casing for the device, the members being provided with a portion 12 shaped for convenient holding in the hand of an operator. The members 11 and 12 are attached to each other by a plurality of screws or bolts indicated by the numeral 13. Formed in the members 10 and 11 is a closed substantially triangular passageway or race 16 which in cross-section is circular and permits a hardened steel ball 17 to travel therearound. Reciprocably mounted in an opening 18 formed in the assembled members 10 and 11 at the apex of the triangular race 16 is a working tool 19 which in the embodiment illustrated comprises a rivet set. It will be apparent that the working end of the tool 19 may be designed for vibrating or peening operations or have other shapes adapted to perform material working operations.

The tool or rivet set 19 is provided with an enlarged portion 20 intermediate its ends which fits within an enlarged portion 21 of the opening 18 formed in the casing and is retained therein by a threaded bushing 22 through which the working end of the rivet set 19 extends, the opposite end thereof projecting into the race 16 far enough to lie in the path of the ball 17 so as to be engaged thereby.

A valve casing is indicated at 26 which may be connected by a flexible hose 27 to a suitable source (not shown) for supplying air under pressure, the valve being secured to the right hand side of the device near the apex of the triangular race 16 by a plurality of screws 28, one of which is indicated in dotted outline. Reciprocably mounted in a recess formed in the valve casing is a valve 29, the stem of which extends upwardly and abuts a link rod 30 supported and guided at its upper and lower ends in the casing of the device comprising the members 10 and 11 and the valve casing 26, respectively. Pivotally carried as indicated at 31 in depressions formed in the members 10 and 11 is a finger trigger or lever 32, the short arm of which at its under side engages the upper end of the link rod 30. A channel 33 is provided in the valve casing 26 and the members 10 and 11, which connects with a channel 34 provided in the members 10 and 11, the latter channel connecting with the race 16. A bushing or sleeve 35 is inserted between the valve casing 26 and the members 10 and 11 to provide a seal between the channels 33 and 34. A plurality of openings 36 are formed in the members 10 and 11 which connect the race 16 with atmosphere, the openings 36 extending through both members 10 and 11 at a suitable point below the connection of the channel 34 with the race 16, only one set of the openings being shown in the drawings.

In operation, it will be apparent upon rocking the lever 32 counter-clockwise about its pivot 31 that the valve 29 will be opened to permit compressed air from the supply hose 27 to pass through the channels 33 and 34 and into the race 16, the air blast being directed upwardly around the race and behind the ball which normally rests upon the inner end of the tool, as shown in the drawings when the device is vertically disposed in operative relation with work to be performed. Although the device is shown in the drawings with the tool 19 disposed in a vertical working position, it will be apparent that it may be freely manipulated so as to apply the tool at any angular working position. The force of the air causes the ball 17 to travel in the direction of the arrows around the race 16, thus providing a maximum travel or stroke thereto after receiving a blast of air before it strikes the end of the tool 19 extending into the race at the apex of the triangle. The ball after imparting its blow to the tool 19 rebounds upward into the right hand side of the triangular race 16 and into the zone of the air continually being projected from the channel 34, the spent air passing to atmosphere through the openings 36. The ball is thus caused to continually traverse the race at a high rate of speed and impart hammer blows in rapid succession to the tool 19 positioned at the apex of the triangular race 16. The timing of the blows and the number thereof struck may be readily controlled by the operation of the valve 29 in a well known manner.

In the modified form of the device shown in Fig. 2, the principal difference is that the air blast is directed downwardly from the upper portion of the triangular race 16 directly against the ball 17 normally resting at the apex thereof, instead of upwardly as occurs in the device illustrated in Fig. 1, thereby causing the ball to travel in a clockwise direction or in the direction of the arrows around the race, the spent air passing to atmosphere through openings 37 similar to the openings 36 described in connection with the description of Fig. 1, the openings 37 being disposed above the entrance point of the air into the race 16. The valve 29 as shown in Fig. 2 is carried upon and forms a portion of the handle 12 and is secured to the end and forms a portion of the handle 12 and is secured to the end of the handle by a plurality of screws 28, one of which is indicated in dotted outline. The stem of the valve 29 extends downwardly and directly engages the upper surface of an elongated finger trigger or lever 40 pivoted as indicated at 41 to depending ears 42 formed upon the casing members 10 and 11, one of which is shown. A pin 43 carried by the lever 40 and extending at opposite ends into slots 44 provided in the ears 42 serves to retain the lever in its normal position as shown in the drawing. The channel 33 of the valve casing 26 connects with a channel 45 provided in the members 10 and 11, which in turn connects directly with the race 16. It will be apparent upon rocking the trigger 40 clockwise that the valve 29 will be opened to permit the compressed air to pass through the channels 33 and 45 and into the race 16, thereby causing the ball 17 to rapidly and continually travel in a clockwise direction around the race 16 to cause the operation of the tool 19 in a manner similar to that of the device illustrated in Fig. 1, the spent air passing to atmosphere through the openings 37.

The device shown in Fig. 3 differs from that shown in Figs. 1 and 2, principally by the employment of a plurality of balls 17 instead of one, the balls traversing a closed substantially oval race 46, an air blast being directed downwardly from the upper portion of the race 46 from the channel 45. The passage of the air through the channel 45 is controlled by a valve 29 (not shown) similar to that shown in Figs. 1 and 2, the spent air passing to atmosphere through openings 47 similar to the openings 36 and 37 described in connection with the description of Figs. 1 and 2. A rivet set 48 is reciprocably mounted in an opening 49 formed in the casing members of the device at the lower right hand corner of the race 46, the upper end of the tool 48 being provided with an angularly disposed face 50 which serves to direct the ball toward the left after striking the tool. A pin 51 fixed to the tool 48 and projecting into a slot 52 formed in the casing members it will be apparent serves to prevent any relative rotation of the tool 48 within the opening 49. In operation, upon compressed air entering the race 46 from the channels 45, the balls 17 will be caused to rapidly and continually travel in the direction indicated by the arrow to cause the operation of the tool 48 as hereinbefore described in connection with the devices illustrated in Figs. 1 and 2. In Fig. 3 the balls 46 are shown in an operating position within the race 46, one ball has just struck the top angular surface 50 of the tool 48 and is about to move toward the left and upwardly, the ball at the extreme right hand corner of the race is about to move into the path of the air blast.

In the modified device shown in Fig. 4 which is designed for vibrating or peening purposes, the ball 17 instead of striking a tool positioned at the apex of the triangular race as in the other two forms of the device, makes direct contact with the surface of the material indicated at 54 to be worked upon, otherwise the operation thereof is similar to the device illustrated in Fig. 1.

What is claimed is:

1. In a percussion device, a casing having an endless chamber, a tool operatively associated therewith, an actuator designed to circulate within the chamber and strike the tool during each circulation within the chamber, and means for directing a motive fluid into the chamber adjacent the tool and in a direction away from the tool to operate the actuator, said chamber having a discharge opening for the escape of the spent fluid.

2. In a percussion device, a casing having an endless triangular raceway of circular cross-section, a tool operatively associated at the apex thereof, a ball designed to traverse the raceway and strike the tool during each traverse of the ball within the raceway, and means for projecting a motive fluid into the raceway to operate the ball, said raceway having a discharge opening for the escape of the spent fluid.

3. In a percussion device, a casing having an endless closed triangular raceway of circular cross-section, a tool extending thereinto at the apex thereof, a ball designed to traverse the raceway and strike the tool for each traverse of the ball within the raceway, and means for projecting a motive fluid into the raceway against the ball, said casing provided with an egress port for permitting the escape of the spent fluid from the raceway.

4. In a percussion device, a casing having an endless closed triangular raceway of circular cross-section, a reciprocatory tool extending at one end into the raceway at the apex thereof with its opposite end projecting outside of the casing and provided with a working end, a ball designed to traverse the raceway and strike one end of the tool once during each traverse of the ball within the raceway to cause a movement of the tool, and means for directing a motive fluid into the triangular raceway adjacent the apex thereof and in a direction away from the apex to cause the ball to continually traverse the raceway, said casing provided with an egress portion for permitting the escape of the spent fluid from the race.

5. In a percussion device, a casing having an endless raceway, a tool operatively associated with the casing and projecting within said raceway, an actuator freely movable within the raceway and arranged to strike the tool as it traverses the raceway, and means for projecting a motive fluid into the raceway to cause a continuous forward movement of the actuator within the raceway whereby said actuator imparts a succession of blows upon the tool, said raceway having a discharge opening for the escape of the spent fluid.

6. In a percussion device, a casing having an endless chamber, a tool operatively associated with the casing and projecting within the chamber, an actuator designed to circulate within the chamber and arranged to strike the tool once during each complete traverse of the chamber, and means for projecting a motive fluid into the chamber to cause a circulatory movement of the actuator therein, said chamber having a discharge opening for the escape of the spent fluid.

7. In a percussion device, a casing having an endless triangular raceway, a tool operatively associated with the member and projecting within the raceway at an apex thereof, an actuator movable within the raceway and arranged to strike the tool once during each traverse of the raceway, means for projecting a motive fluid upon the actuator to cause it to traverse the raceway whereby it imparts a succession of blows upon the tool, said raceway having a discharge opening for the escape of the spent fluid.

In witness whereof, I hereunto subscribe my name this 15 day of April, A. D. 1926.

GEORGE LYNDEN ROCK.